US009114758B1

(12) United States Patent  (10) Patent No.: US 9,114,758 B1
Poudrier  (45) Date of Patent: Aug. 25, 2015

(54) CONVERTIBLE CARGO CARRIER AND CART SYSTEM

(71) Applicant: Alan S Poudrier, Niceville, FL (US)

(72) Inventor: Alan S Poudrier, Niceville, FL (US)

(*) Notice: Subject to any disclaimer, the term of this patent is extended or adjusted under 35 U.S.C. 154(b) by 0 days.

(21) Appl. No.: 14/661,651

(22) Filed: Mar. 18, 2015

Related U.S. Application Data

(63) Continuation-in-part of application No. 14/059,006, filed on Oct. 21, 2013, now Pat. No. 8,985,418, and a continuation-in-part of application No. 14/631,695, filed on Feb. 25, 2015.

(60) Provisional application No. 62/023,840, filed on Jul. 12, 2014.

(51) Int. Cl.
  *B60R 9/06* (2006.01)
  *B62H 3/00* (2006.01)
  *B60D 1/00* (2006.01)

(52) U.S. Cl.
  CPC ... *B60R 9/06* (2013.01); *B60D 1/00* (2013.01); *B62H 3/00* (2013.01)

(58) Field of Classification Search
  USPC .......... 224/519–526, 484, 488, 498, 504, 511
  See application file for complete search history.

(56) References Cited

U.S. PATENT DOCUMENTS

| 4,593,840 | A | * | 6/1986 | Chown | 224/520 |
|---|---|---|---|---|---|
| 4,744,590 | A | * | 5/1988 | Chesney | 280/769 |
| 5,011,361 | A | * | 4/1991 | Peterson | 414/462 |
| 5,586,702 | A | * | 12/1996 | Sadler | 224/521 |
| 6,006,973 | A | * | 12/1999 | Belinky et al. | 224/510 |
| 6,139,029 | A | * | 10/2000 | Shaw | 280/8 |
| 6,345,750 | B1 | * | 2/2002 | McCoy et al. | 224/525 |
| 6,550,791 | B2 | * | 4/2003 | Ramsey | 280/47.19 |
| 6,846,017 | B2 | * | 1/2005 | Martin | 280/769 |
| 7,963,530 | B1 | * | 6/2011 | Garcia | 280/30 |
| 8,465,031 | B2 | * | 6/2013 | Coghill, Jr. | 280/79.3 |
| 2002/0005423 | A1 | * | 1/2002 | Grover | 224/509 |
| 2003/0173387 | A1 | * | 9/2003 | Mitchell | 224/499 |
| 2004/0123529 | A1 | * | 7/2004 | Wiese et al. | 52/6 |
| 2008/0206030 | A1 | * | 8/2008 | Reuille et al. | 414/462 |
| 2008/0240897 | A1 | * | 10/2008 | Miro et al. | 414/462 |
| 2010/0102524 | A1 | * | 4/2010 | Larsen et al. | 280/35 |

* cited by examiner

*Primary Examiner* — Brian D Nash
(74) *Attorney, Agent, or Firm* — Peter Loffler

(57) ABSTRACT

A hitch receiver mounted cargo carrier has a series of mount stations onto which various accessories can be removably attached. A handle, either manual or attachable to another vehicle, is received within the hitch mountable receiver tube. Vertical members, which can hold, grills, fishing rods or act as rails, etc., are attached within gaps between grid blocks located on either end of the carrier. A pair of latitudinal channels, which are part of holding rails of the top surface of the carrier, can support horizontal members, such as canopy rails. Landing gear, with or without wheels attached can be pivotally mounted proximate either end of the carrier.

18 Claims, 5 Drawing Sheets

CONVERTIBLE CARGO CARRIER AND CART SYSTEM

This application is a continuation-in-part of U.S. patent application Ser. No. 14/059,006, filed on Oct. 21, 2013, and is a continuation-in-part of U.S. patent application Ser. No. 14/631,696, filed on Feb. 25, 2015, which claims the benefit of U.S. application No. 62/023,840, filed on Jul. 12, 2014, all of which are incorporated herein by reference in their entirety.

BACKGROUND OF THE INVENTION

1. Field of the Invention

The present invention relates to a device that functions as a cargo carrier that is removably attached to a tailgate hitch receiver and that can hold various accessories and that can convert to a wheeled cart, pulled either by hand or by a velocipede.

2. Background of the Prior Art

Many sport utility vehicle (SUV) and pickup truck owners, and even some automobile owners find that they simply lack sufficient cargo storage capacity for many trips and turn to tailgate hitch mounted carriers in order to increase the cargo capacity of the vehicle. Such hitch mounted carriers, which come in varying architectures, are removably attached to the tailgate hitch found on the rear of the vehicle and extend rearwardly therefrom. The carriers have a relatively flat bottom with peripheral sidewalls extending upwardly therefrom in order to help keep the cargo thereon. Some sidewalls have openings or are otherwise formed as a frame and truss configuration in order to provide tie-down points for the cargo that is loaded onto the carrier. Many carriers are very strong and sturdy and can carrier a fair amount of relatively heavy cargo.

Tailgate hitch mounted carriers are very versatile in increasing the cargo capacity of the vehicle to which such carriers are attached. However, such carriers are a unitary function article in that upon arrival at a destination, for example a picnic ground, the carriers tend to offer little further utility to their use, other than possibly acting as a temporary storage platform for which a fold out table may be better suited. Often the user has other needs at the destination, such as helping support a grill or securing a pop-up canopy from sun and wind effects. Such additional needs can either be met through labor, such as digging a hole for the post of the grill and securing the grill therein, or providing an appropriate anchoring device for the canopy. However, such need resolutions either require time-consuming and often difficult manual labor on the part of the user or his or her entourage, or the carrying of additional cargo which may require sacrificing other desired articles from being transported despite the use of the carrier.

Additionally, current carriers do no offer help in transporting cargo other via the vehicle to which they are attached. In order to transport cargo other than via the vehicle, other carrying devices must be employed, such as coolers or dollies, which devices take up further cargo capacity of the vehicle, leaving less room for other accessories.

Accordingly, there is a need in the art for a device that can increase the overall utility of a typical tailgate hitch mounted carrier so that the carrier has substantial utility to a user beyond the primary cargo transport function. Such a device must provide support for a variety of articles in order to reduce the need for time-consuming and difficult manual labor or the need to transport additional articles. Such a device must offer assistance in cargo transport when detached from the vehicle to which the carrier is attached. Such a device must be of relatively simple construction and be easy to use.

SUMMARY OF THE INVENTION

The convertible cargo carrier and cart system of the present invention addresses the aforementioned needs in the art by providing a comprehensive carrier that is removably attached to the distal end of a typical tailgate hitch mounted carrier in quick and easy fashion, wherein the convertible cargo carrier and cart system is able to support and secure a variety of elongate articles in either an upward orientation or downward orientation, or both. One such downwardly oriented elongate article that is able to be supported by the present invention is a pair of wheels, either in a fixed downward orientation, or in a pivoted attachment in order to allow the wheels to landing-gear-pivot between a generally horizontal orientation (stowed) and a generally vertical orientation (deployed), allowing the convertible cargo carrier and cart system to function as a land cart for transporting cargo when detached from the vehicle. A desired handle, either a handheld handle, or a handle that attaches to a velocipede or other vehicle (ATV, motorcycle, etc.,), is attachable to the convertible cargo carrier and cart system in order to tow the device that has been converted to a cart. The convertible cargo carrier and cart system is of relatively simple design and construction, being produced using standard manufacturing techniques, so as to make the device relatively inexpensive to produce so as to make the invention economically attractive to potential consumers of this type of device. The convertible cargo carrier and cart system is quickly and easily converted to a desired architecture for a particular job in short order, using at most basic handle tool to perform the conversion.

The convertible cargo carrier and cart system is comprised of a carrier that has a frame that has a front end, an opposing back end, joined by a first side and an opposing second side, a top surface and a bottom surface. A receiver tube that is receivable within a hitch receiver of a vehicle extends longitudinally and horizontally outwardly from the front end of the carrier. A pair of tube members forms a portion of the top surface. Each tube member has a latitudinally disposed tube channel extending between the first side and the second side. The bottom surface of the carrier has an open front channel lattitudinally disposed proximate the first end of the carrier and an open back channel lattitudinally disposed proximate the back end of the carrier. The front channel and the back channel are each joined by an open first side channel disposed proximate the first side and an open second side channel disposed proximate the second side. A first pivot bolt opening faces the front channel and a second pivot bolt opening faces the front channel and corresponds with the first pivot bolt opening. At least one of the receiver tubes has a series of spring-loaded button openings disposed on an upper wall thereof. A third pivot bolt opening faces the back channel while a fourth pivot bolt opening faces the back channel and corresponding with the third pivot bolt opening. At least one tray is attached to the receiver tube and is accessible through the top surface. A series of spaced apart vertically oriented block channels are located at the back end of the carrier or the front end of the carrier or both. The block channels are formed by attaching a series of spaced apart grid blocks to the back end and/or front end of the carrier and attaching a plate to the grid blocks, each block channel bounded by a pair of grid blocks, the back end and/or front end of the carrier and the plate.

BRIEF DESCRIPTION OF THE DRAWINGS

Similar reference numerals refer to similar parts throughout the several views of the drawings.

DESCRIPTION OF THE PREFERRED EMBODIMENT

Figure 1L:
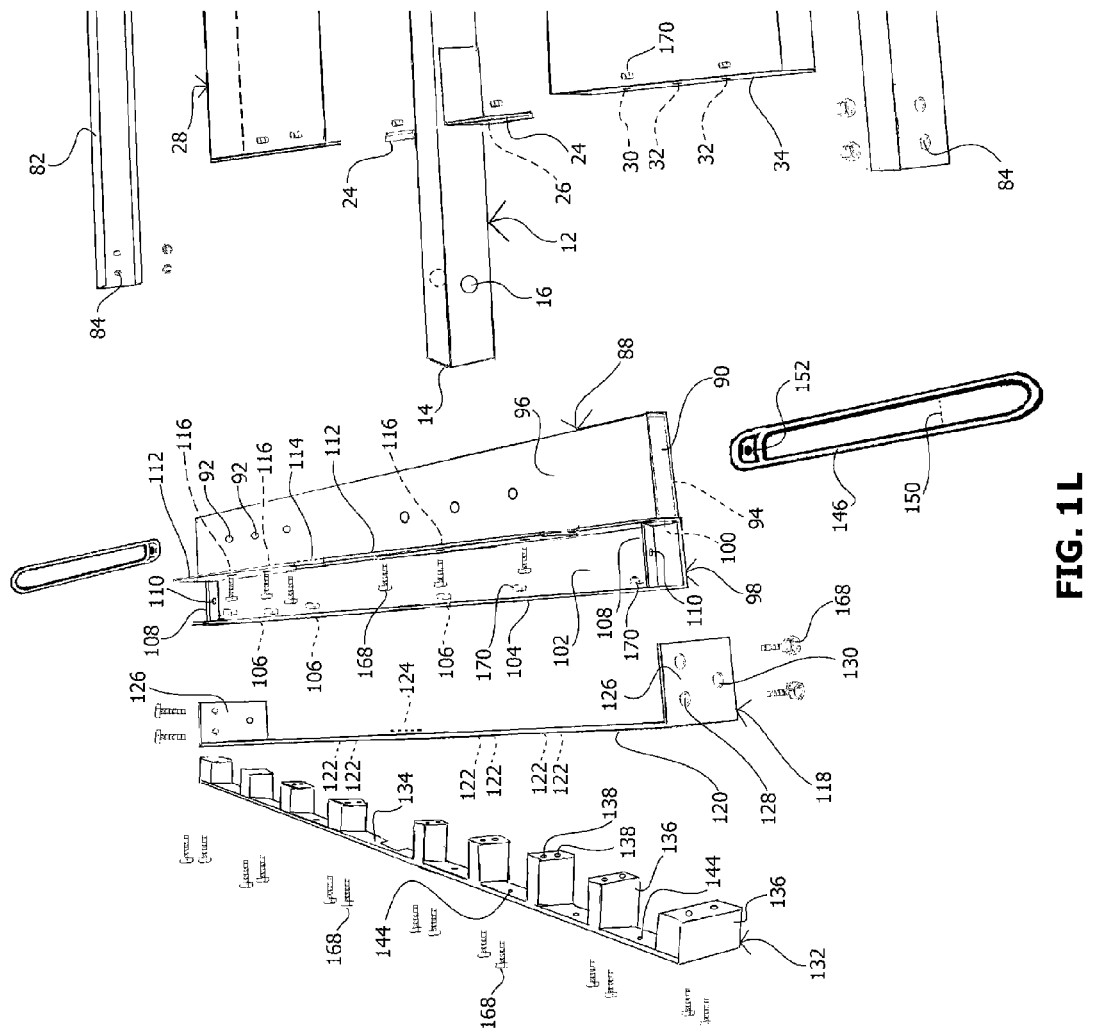
FIG. 1L is an exploded view of the left side of the convertible cargo carrier and cart system of the present invention.
Figure 1R:
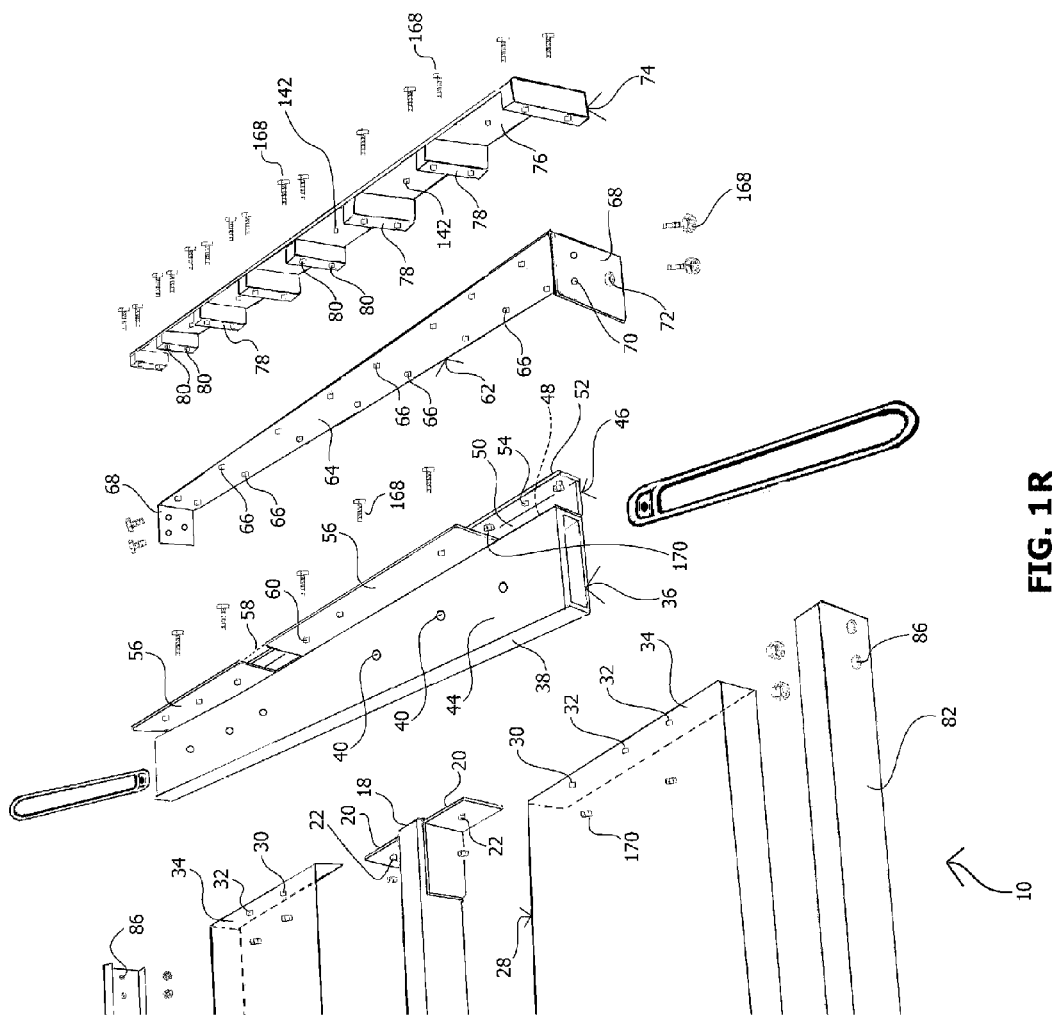
FIG. 1R is an exploded view of the right side of the convertible cargo carrier and cart system that mates up with FIG. 1.

Referring now to the drawings, it is seen that the convertible cargo carrier and cart system of the present invention, generally denoted by reference numeral 10, is comprised of a receiver tube 12 that has a first end 14 having a pair of corresponding openings 16 located proximate thereto, and a second end 18. A first pair of angle plates 20 is attached to the second end 18 of the receiver tube 12, one on either side of the receiver tube 12, each having a first angle bolt opening 22, while a second pair of angle plates 24 is attached to the receiver tube 12 medially between the first end 14 and the second end 18, again on either side of the receiver tube 12, each second angle plate 24 having a second angle bolt opening 26 and each second angle plate 24 facing the first angle plate 20 on its side of the receiver tube 12. Each angle plate 20 and 24 is attached to the receiver tube 12 in appropriate fashion such as via a low profile fastener (bolts and nuts, rivet, etc., none illustrated) or via welding.

A pair of trays 28 is provided and each is positioned between a respective one of the first angle plate 20 second angle plate 24 pair located on one side of the receiver tube 12. As seen, each tray has an inbound bolt opening 30 and one or more outbound bolt openings 32 on its opposing sidewalls 34. The first angle plate 20 second angle plate 24 pair is spaced apart so that the tray 28 fits snugly between the angle plate pair and such that the inbound bolt openings 30 align with the first angle bolt openings 22 of the first angle plate 20 and the second angle bolt openings 26 of the second angle plate 24 on the respective angle plate 20 and 24 against which the tray sidewall 34 is abutting—the trays 28 are illustrated as not having an inner end wall with the receiver tube 12 acting as the inner end wall, thereby conserving material and weight. However, if the angle plates 20 and 24 are bolted or riveted to the receiver tube 12, then the trays may be provided with such end walls with the bolts passing through such end walls in attaching both the tray and the angle plates to the receiver tube 12.

A rear platform 36 has a hollow elongate rear tube member 38 that is open on either end and that has a series of button openings 40 located along its top wall 42 (or possibly the bottom wall 44). A rear channel member 46 extends outwardly from the joinder of the bottom wall 44 and outer sidewall 48 of the rear tube member 38. As seen, the rear channel member 46 has a rear channel base plate 50 and a rear channel side plate 52 having a series of rear channel bolt openings 54 thereon, the rear channel member 46 forms an elongate open channel essentially coextensive with the rear tube member 38. A rear mounting flange 56 extends upwardly from the joinder of the bottom wall 44 and outer sidewall 48 of the rear tube member 38 and has a notch or gap 58 at its midpoint, the gap 58 not strictly needed on the rear mounting flange 56 as the receiver tube 12 does not intersection the rear mounting flange 56. A series of rear flange bolt openings 60 are located on either side of the gap 58. The various items, including the rear tube member 38, the rear channel member 46 and the rear mounting flange 56 are connected to each other in appropriate fashion such as via welding or the rear tube member 38, the rear channel member 46 and the rear mounting flange 56 may be formed as one unit via extrusion.

A rear end mount 62 has a rear end plate 64 having a series of rear end plate bolt opening pairs 66 located along its length. A rear side plate 68 extends inwardly from each end of the rear end plate 64. As seen, each rear side plate 68 has a pair of side plate bolt openings 70 and a rear mount pivot bolt opening 72.

A rear vertical receiver 74 has a rear base plate 76 with a series of rear base plate bolt opening pairs (not separately illustrated or numbered), while a series of rear grid blocks 78 each have a pair of rear grid bolt openings 80 that each align with a respective one of the rear plate bolt opening pairs of the rear base plate 76. If desired, the rear grid blocks 78 may be welded to the rear base plate 76, although such is not necessary.

A pair of side rails 82 is provide such that each side rail 82 has a pair of front rail bolt openings 84 proximate the forward end thereof and a pair of rear rail bolt openings 86 proximate a rearward end thereof.

To assemble this sub-portion of the convertible cargo carrier and cart system 10, each tray 28 is positioned between its respective first angle plate 20 and second angle plate 26 such that the inbound bolt opening 30 of each tray 28 aligns with the first angle bolt opening 22 of that tray's first angle plate 20. The rear platform 36 is positioned so that the rear mounting flange 56 abuts the sidewall 34 of the trays 28 and so that the rear flange bolt openings 60 on either side of the gap 58 and nearest the gap 58 of the rear mounting flange 56 align with a respective one of the aligned inbound bolt opening 30 and first angle bolt opening 22. The remaining rear flange bolt openings 60 of the rear mounting flange 56 align with one of the outbound bolt openings 32 of one of the trays 28. Bolts 168 are passed through all aligned openings and secured via appropriate nuts 170. The rear end plate 62 is positioned so as to abut the rear channel side plate 82 so that each of the lower row of rear end plate bolt openings 66 aligns with a respective one of the rear channel bolt openings 54. Additionally, each side rail 82 is positioned so as to abut against the rear channel side plate 52 such that the rear rail bolt openings 86 each align with respective rear side plate bolt openings 70 with bolts 168 passed through each of the aligned rear rail bolt openings 86 and rear side plate bolt opening 70 pairs. The rear vertical receiver 74 is positioned so that the rear grid blocks 78 abut the outer surface of the rear end plate 64 of the rear end mount 62 so each rear base plate bolt openings aligns with a respective one of the rear grid block bolt openings 80 and that each aligned opening pair aligns with a respective one of the rear end plate bolt opening 66 and the all of the aligned bolt opening triples along the lower row align with a respective one of the rear channel bolt openings 54. Bolts 168 are passed through all aligned bolt opening triples or quads and secured via appropriate nuts 170.

The forward end of the convertible cargo carrier and cart system 10 is substantially similar to the just described rearward end of the convertible cargo carrier and cart system 10 except with appropriate notches gaps to account for the receiver tube 12.

Specifically, a front platform 88 has a hollow elongate front tube member 90 that is open on either end and that has a series of button openings 92 located along its top wall 94 (or possibly the bottom wall 96—button openings may be provided only on the front tube member 90, the rear tube member 38, or both. A front channel member 98 extends outwardly from the joinder of the top wall 94 and outer sidewall 100 of the front tube member 90. As seen, the front channel member 98 has a front channel base plate 102 and a front channel side plate 104 having a series of front channel bolt openings 106 thereon, the front channel member 98 forms an elongate open channel essentially coextensive with the front tube member 90. As seen, a pair of mount plates 108 extends across the channel of the front channel member 98, just inward from either end thereof, each mount plate 108, having a mount plate opening 110. A front mounting flange 112 extends upwardly from the joinder of the bottom wall 96 and outer sidewall 100 of the front tube member 90 and has a notch or gap 114 at its midpoint. A series of front flange bolt openings 116 is located on either side of the gap 114. The various items, including the front tube member 90, the front channel member 98 and the front mounting flange 112 are connected to each other in appropriate fashion such as via welding or the front tube member 90, the front channel member 98 and the front mounting flange 112 may be formed form as one unit via extrusion.

A front end mount 118 has a front end plate 120 having a series of front end plate bolt opening pairs 122 located along its length, the front end plate 120 having a notch 124 to allow the receiver tube 12 to pass therethrough (the rear end plate 64 may be similarly notched even though it does not need to be for ease of manufacturing and assembly). A front side plate 126 extends inwardly from each end of the front end plate 120. As seen, each front side plate 126 has a pair of front side plate bolt openings 128 and a front mount pivot bolt opening 130.

A front vertical receiver 132 has a front base plate 134 with a series of front base plate bolt opening pairs (not separately illustrated or numbered), while a series of front grid blocks 136 each have a pair of front grid block bolt openings 138 that align with a respective one of the front plate bolt opening pairs of the front base plate 134. If desired, the front grid blocks 136 may be welded to the front base plate 134, although such is not necessary. The front base plate 134 is notched to allow the receiver tube 12 to pass therethrough (the rear base plate 76 may be similarly notched even though it does not need to be, for ease of manufacturing and assembly).

To assemble this sub-portion of the convertible cargo carrier and cart system 10, the front platform 88 is positioned so that the front mounting flange 112 abuts the sidewall 34 of the trays 28 and so that the front flange bolt openings 116 on either side of the front gap 114 and nearest the front gap 114 of the front mounting flange 112 align with a respective one of the aligned inbound bolt opening 30 and second angle bolt opening 26. The remaining front flange bolt openings 116 of the front mounting flange 112 align with one of the outbound bolt openings 32 of one of the trays 28. Bolts 168 are passed through all aligned openings and secured via appropriate nuts 170. The front end mount 118 is positioned so as to abut the front channel side plate 104 so that each of the lower row of front end plate bolt openings 122 aligns with a respective one of the front channel bolt openings 106 with the receiver tube 12 passing through the notch 124. The front rail bolt openings 84 of the side rails 82 each align with a respective one of the front side plate bolt openings 128 with bolts 168 passed through each of the aligned front rail bolt openings 84—front side plate bolt opening 128 pairs. The front vertical receiver 132 is positioned so that the front grid blocks 136 abut the outer surface of the front end plate 120 of the front end mount 118 so that each front base plate bolt openings aligns with a respective one of the front grid block bolt openings 138 and so that each aligned pair aligns with a respective one of the front end plate bolt opening 122 and the all of the aligned bolt opening triples along the lower row align with a respective one of the front channel bolt openings 106, the receiver tube 12 passing through the notch. Bolts 168 are passed through all aligned bolt opening triples or quads and secured via appropriate nuts 170.

The various components of the convertible cargo carrier and cart system 10 can be made from an appropriate sturdy material such as metal including aluminum.

Figure 2:
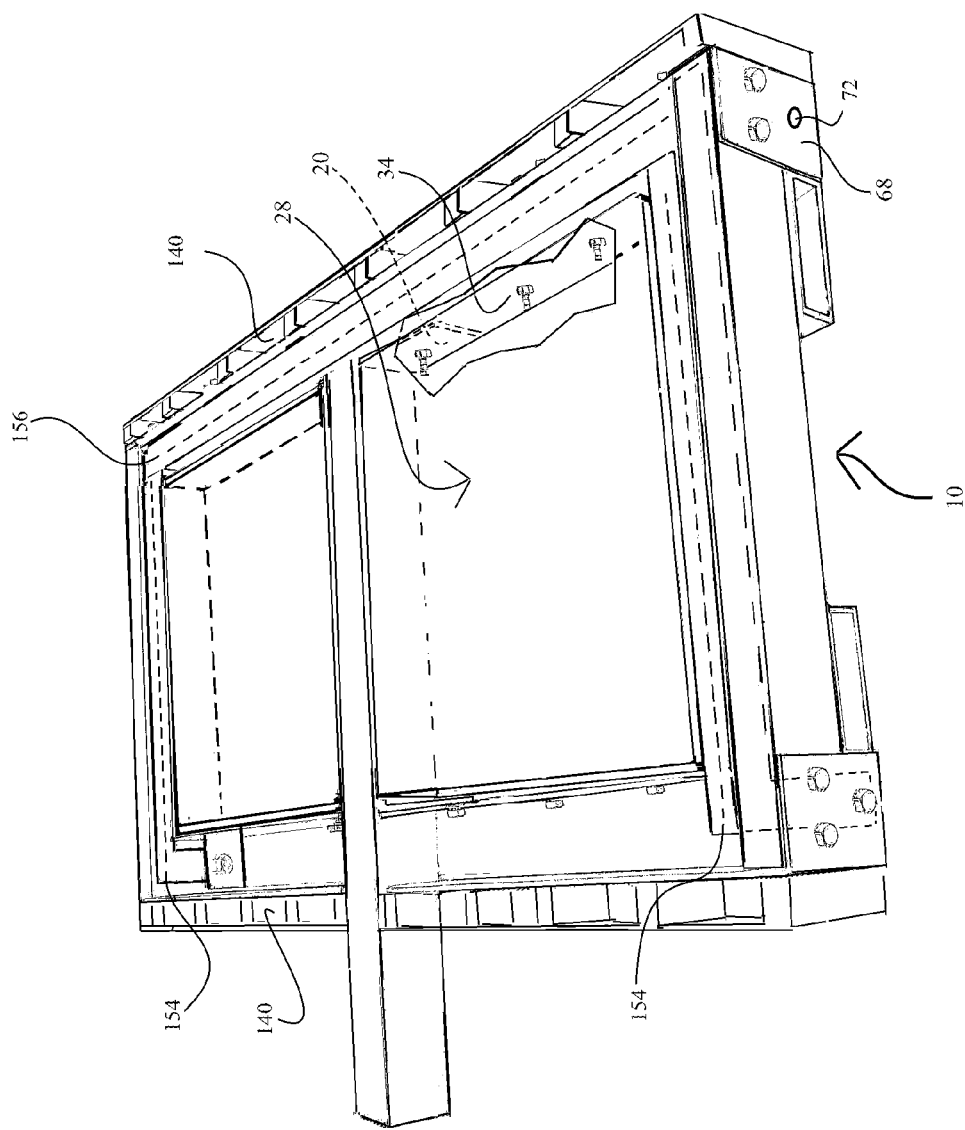
FIG. 2 is a bottom perspective view, partially cut away, of the convertible cargo carrier and cart system.
Figure 3:
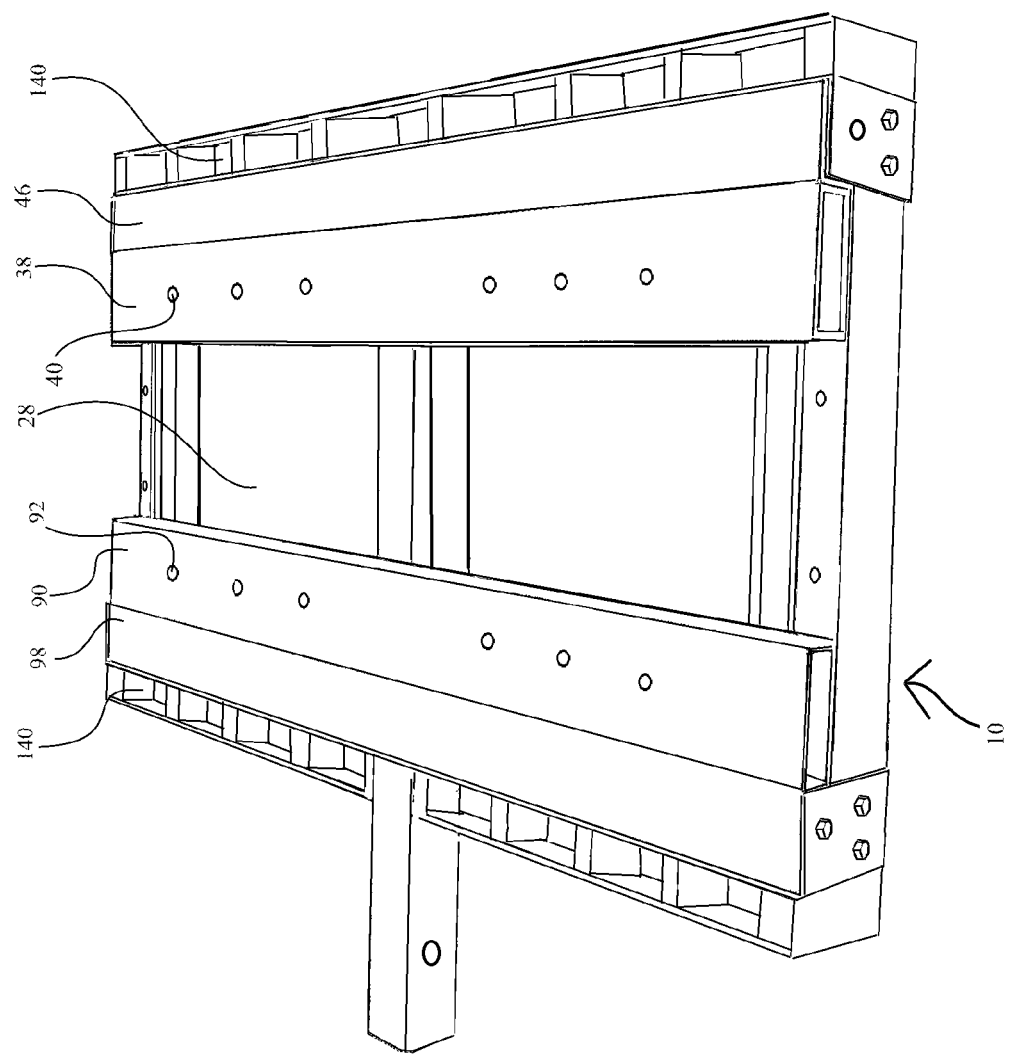
FIG. 3 is a top perspective view of the convertible cargo carrier and cart system.
Figure 4:
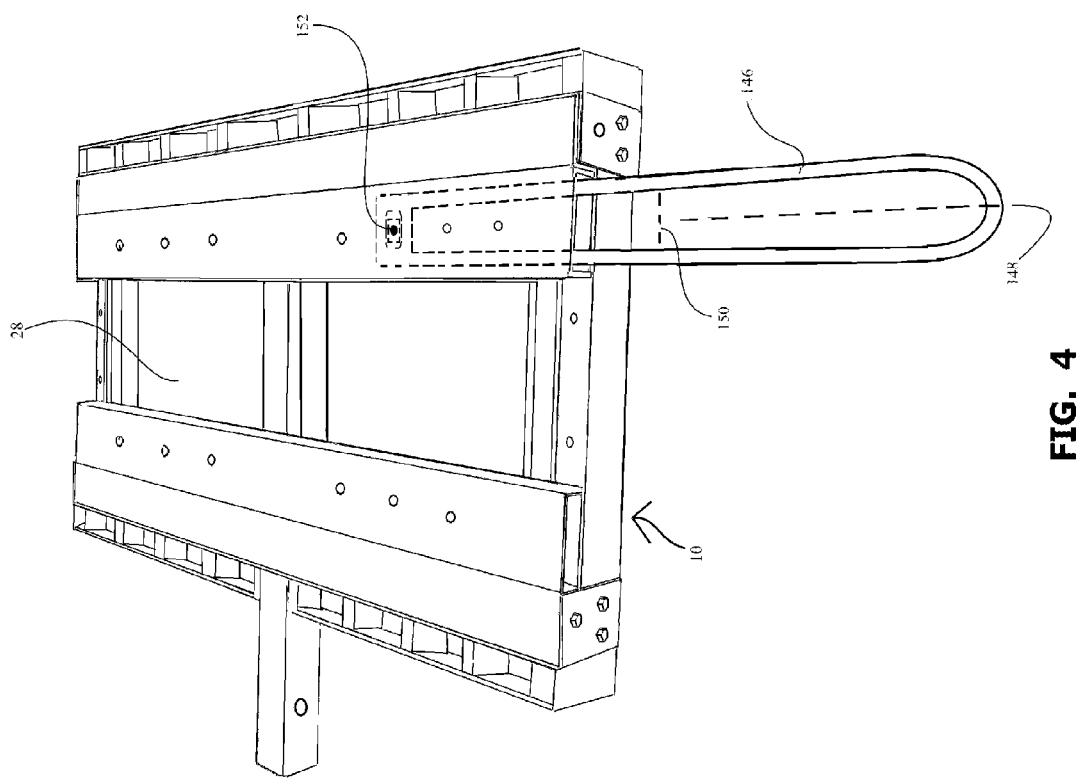
FIG. 4 is a top perspective view of the convertible cargo carrier and cart system using a novel bicycle holder.

The convertible cargo carrier and cart system 10 is now assembled and ready for use. The convertible cargo carrier and cart system 10 can be attached to a vehicle in normal fashion by having the front end 14 of the receiver tube 12 received within the receiver hitch of a vehicle and pinned therein by passing an appropriate pin through the openings 16 of the receiver tube 12 that align with openings of the receive hitch in the usual way. The convertible cargo carrier and cart system 10 has five main areas of securement for cargo. One securement area is the top or upper surface of the convertible cargo carrier and cart system 10 being formed of the various members that make up the upper surface, as best illustrated in FIG. 3. Cargo can be loaded onto the top and secured as desired, in essentially typical cargo carrier fashion. Another securement area is the two trays 28 that can hold various small items such as fasteners, small hand tools, fishing tackle, etc. Another securement area is the vertical gaps 140 between the rear grid blocks 78 and front grid blocks 136. A vertical member, such as a post to hold a grill or a tube that acts as a fishing pole holder are received within the gap 140, and can extend down to the ground for support, such as a grill post or can be secured by passing a bolt through openings 142 between the rear grid blocks 78 or openings 144 between the front grid blocks 136 and through the item to be secured. Hooks can also be screwed into these bolt openings 142 and 144 in order to allow securement of devices to the hooks or for use as tie-down strap securement points. Another securement area is the horizontal channels formed within the rear tube member 38 and front tube member 90. A horizontal bar, such as possibly a horizontal support leg of a pop up canopy, can pass through one of the horizontal channels and be secured thereby. As seen in FIG. 4, another horizontal channel support item is a bicycle holder, which as seen is a rod 146 that forms an elongate loop 148 with a gap 150 and which has a spring loaded push button 152 on an end thereof. The bush button end of the rod 146 is inserted into the horizontal channel until the push button 152 aligns with a desired one of the button openings, either 40 or 92, depending on which platform is being used. A second bicycle holder is attached to the opposite side of this horizontal channel. The wheels of a bicycle are each received within one of the loops 148. The bicycle holders can be moved into or out of the channel as needed, aligning the push button 152 with a desired button opening 40 or 92, depending on the size of the bicycle. Another securement area is the underside of the convertible cargo carrier and cart system 10. As seen in FIG. 2, a pair of horizontal longitudinal channels 154 is formed mainly by the side rails 82 and the trays 28 while a pair of horizontal latitudinal channels 156 is created by the rear mounting flange 56 and the rear plate mount 62 and the front channel member 98 and front mounting flange 112. A leg can be pivotally attached to the convertible cargo carrier and cart system 10, one leg on each side, by positioning the leg such that its openings aligns with the mount plate opening 110 and the front mount pivot bolt opening 130 and passing a bolt through the aligned openings and securing with an appropriate nut. The leg can pivot into and out of its respective 5 longitudinal channel 154. If a cross bar (which may have wheels thereon), such as a landing bar is attached to the ends of the legs, the landing bar can seat within the outer latitudinal channel 156.

A handle can be inserted into the channel formed at the front 14 of the receiver tube 12 and pinned therein and used to pull the convertible cargo carrier and cart system 10 (wheels 10 being attached to either the grid block subsystem or to the underside mount subsystem) via hand or attaching the handle to another vehicle such as a velocipede, an ATV, a motorcycle, etc., in appropriate fashion Many examples of the versatility of the convertible cargo carrier and cart system 10 have been illustrated in the parent application.

While the invention has been particularly shown and described with reference to an embodiment thereof, it will be appreciated by those skilled in the art that various changes in form and detail may be made without departing from the spirit and scope of the invention.

I claim:

1. An article support system comprising a carrier having a frame that has a front end, an opposing back end, joined by a first side and an opposing second side, a top surface and a bottom surface, such that a hitch receiver receivable receiver tube extends outwardly from the front end and such that a pair of tube members form a portion of the top surface such that each tube member has a tube channel extending between the first side and the second side and such that the bottom surface has an open front channel disposed proximate the first end and an open back channel disposed proximate the back end, the front channel and the back channel joined by an open first side channel disposed proximate the first side and an open second side channel disposed proximate the second side such that a first pivot bolt opening faces the front channel and a second pivot bolt opening faces the front channel and aligns with the first pivot bolt opening, each tube channel, the front channel, and the back channel all being in perpendicular orientation to the receiver tube.

2. The article support system as in claim 1 wherein at least one of the receiver tubes has a series of spring-loaded button openings disposed on an upper wall thereof.

3. The article support system as in claim 2 further comprising a third pivot bolt opening facing the back channel and a fourth pivot bolt opening facing the back channel and aligning with the third pivot bolt opening.

4. The article support system as in claim 3 further comprising at least one tray attached to the receiver tube and accessible through the top surface.

5. The article support system as in claim 4 further comprising a series of spaced apart vertically oriented block channels located at the back end of the carrier.

6. The article support carrier as in claim 5 wherein the block channels are formed by attaching a series of spaced apart grid blocks to the back end of the carrier and attaching a plate to the grid blocks, each block channel bounded by a pair of the grid blocks, the back end of the carrier and the plate.

7. The article support carrier as in claim 6 further comprising a series of grid bolt openings disposed within the plate and located between each pair of adjoining grid blocks.

8. The article support system as in claim 4 further comprising a series of spaced apart vertically oriented block channels located at the front end of the carrier.

9. The article carrier as in claim 8 wherein the block channels are formed by attaching a series of spaced apart grid blocks to the back end of the carrier and attaching a plate to the grid blocks, each block channel bounded by a pair of the grid blocks, the back end of the carrier and the plate.

10. The article support carrier as in claim 9 further comprising a series of grid bolt openings disposed within the plate and located between each pair of adjoining grid blocks.

11. The article support system as in claim 1 further comprising that a third pivot bolt opening facing the back channel and a fourth pivot bolt opening facing the back channel and aligning with the third bolt opening.

12. The article support system as in claim 1 further comprising at least one tray attached to the receiver tube and accessible through the top surface.

13. The article support system as in claim 1 further comprising a series of spaced apart vertically oriented block channels located at the back end of the carrier.

14. The article support carrier as in claim 13 wherein the block channels are formed by attaching a series of spaced apart grid blocks to the back end of the carrier and attaching a plate to the grid blocks, each block channel bounded by a pair of the grid blocks, the back end of the carrier and the plate.

15. The article support carrier as in claim 14 further comprising a series of grid bolt openings disposed within the plate and located between each pair of adjoining grid blocks.

16. The article support system as in claim 1 further comprising a series of spaced apart vertically oriented block channels located at the front end of the carrier.

17. The article support carrier as in claim 16 wherein the block channels are formed by attaching a series of spaced apart grid blocks to the back end of the carrier and attaching a plate to the grid blocks, each block channel bounded by a pair of the grid blocks, the back end of the carrier and the plate.

18. The article support carrier as in claim 17 further comprising a series of grid bolt openings disposed within the plate and located between each pair of adjoining grid blocks.

* * * * *